United States Patent
Mayo et al.

(10) Patent No.: US 11,182,256 B2
(45) Date of Patent: Nov. 23, 2021

(54) BACKUP ITEM METADATA INCLUDING RANGE INFORMATION

(71) Applicant: HEWLETT PACKARD ENTERPRISE DEVELOPMENT LP, Houston, TX (US)

(72) Inventors: Richard Phillip Mayo, Bristol (GB); David Malcolm Falkinder, Bristol (GB); Andrew Todd, Bristol (GB); Peter Thomas Camble, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 537 days.

(21) Appl. No.: 15/789,198

(22) Filed: Oct. 20, 2017

(65) Prior Publication Data

US 2019/0121705 A1    Apr. 25, 2019

(51) Int. Cl.
*G06F 11/14* (2006.01)
*G06F 16/23* (2019.01)
*G06F 16/174* (2019.01)

(52) U.S. Cl.
CPC ...... *G06F 11/1453* (2013.01); *G06F 16/1752* (2019.01); *G06F 16/2365* (2019.01); *G06F 2201/80* (2013.01); *G06F 2201/805* (2013.01); *G06F 2201/82* (2013.01)

(58) Field of Classification Search
None
See application file for complete search history.

(56) References Cited

U.S. PATENT DOCUMENTS

| | | |
|---|---|---|
| 5,347,653 A | 9/1994 | Flynn et al. |
| 7,107,298 B2 | 9/2006 | Prahlad et al. |
| 8,442,952 B1 | 5/2013 | Armangau et al. |
| 8,458,144 B2 | 6/2013 | Maydew et al. |
| 8,533,231 B2 | 9/2013 | Aizman et al. |
| 8,635,184 B2 | 1/2014 | Hsu et al. |
| 8,650,159 B1 | 2/2014 | Zhang et al. |
| 8,694,469 B2 | 4/2014 | Parab |
| 8,745,095 B2 | 6/2014 | Bestler et al. |

(Continued)

OTHER PUBLICATIONS

Amazon Web Services, Inc., "Working with Folders," Sep. 1, 2016, <http://docs.aws.amazon.com/AmazonS3/latest/UG/FolderOperations.html> (2 pages).

(Continued)

*Primary Examiner* — Alex Gofman
*Assistant Examiner* — Umar Mian
(74) *Attorney, Agent, or Firm* — Hewlett Packard Enterprise Patent Department

(57) ABSTRACT

In some examples, in response to an event at the deduplication system, a system accesses item metadata of a backup item that is backed up to a remote object storage system, the item metadata of the backup item including range information indicating a range of identifier values for portion objects of the backup item stored in the remote object storage system. The system issues, based on the range information, requests to obtain respective attribute information of the portion objects of the backup item stored in the remote object storage system. The system determines, based on the attribute information, a name of a given portion object of the backup item already used.

19 Claims, 3 Drawing Sheets

(56) References Cited

U.S. PATENT DOCUMENTS

| | | | |
|---|---|---|---|
| 8,868,520 B1* | 10/2014 | Raghuwanshi | G06F 11/1004 707/692 |
| 8,918,372 B1 | 12/2014 | Guo et al. | |
| 9,015,181 B2 | 4/2015 | Kottomtharayil et al. | |
| 9,110,964 B1 | 8/2015 | Shilane et al. | |
| 9,128,626 B2 | 9/2015 | Chacko | |
| 9,235,475 B1 | 1/2016 | Shilane et al. | |
| 9,251,161 B2 | 2/2016 | Rao et al. | |
| 9,317,377 B1 | 4/2016 | Wu et al. | |
| 10,346,297 B1* | 7/2019 | Wallace | G06F 3/0641 |
| 2006/0036658 A1 | 2/2006 | Henrickson | |
| 2008/0243958 A1 | 10/2008 | Prahlad et al. | |
| 2010/0070478 A1* | 3/2010 | Anglin | G06F 11/1464 707/674 |
| 2010/0332401 A1 | 12/2010 | Prahlad et al. | |
| 2010/0332456 A1 | 12/2010 | Prahlad et al. | |
| 2011/0106768 A1 | 5/2011 | Khanzode et al. | |
| 2011/0161291 A1 | 6/2011 | Taleck et al. | |
| 2011/0161723 A1 | 6/2011 | Taleck et al. | |
| 2012/0084261 A1 | 4/2012 | Parab | |
| 2012/0109907 A1 | 5/2012 | Mandagere et al. | |
| 2012/0166403 A1 | 6/2012 | Kim et al. | |
| 2012/0233228 A1 | 9/2012 | Barton et al. | |
| 2012/0290546 A1* | 11/2012 | Smith | G06F 3/0641 707/700 |
| 2013/0042083 A1* | 2/2013 | Mutalik | G06F 3/0604 711/162 |
| 2014/0189432 A1 | 7/2014 | Gokhale et al. | |
| 2014/0324793 A1 | 10/2014 | Glazemakers | |
| 2014/0358858 A1 | 12/2014 | Camble et al. | |
| 2015/0199367 A1 | 7/2015 | Hammer et al. | |
| 2015/0227543 A1 | 8/2015 | Venkatesh et al. | |
| 2016/0170657 A1 | 6/2016 | Suehr et al. | |
| 2016/0191508 A1* | 6/2016 | Bestler | H04L 63/0853 713/163 |
| 2016/0191509 A1* | 6/2016 | Bestler | G06F 16/2255 713/163 |
| 2018/0314706 A1* | 11/2018 | Sirton | G06F 16/1837 |
| 2020/0057752 A1* | 2/2020 | Tofano | G06F 16/22 |

OTHER PUBLICATIONS

Amazon Web Services, Inc., "Amazon EBS Product Details," Aug. 16, 2016, <https://aws.amazon.com/ebs/details/> (8 pages).
BridgeSTOR, LLC, "Cloud Storage File System (CSFS™)," Aug. 16, 2016, <http://www.bridgestor.com/English/Technology/Cloud_Storage_File_System.html> (2 pages).
Commvault Systems(R) Inc., "Cloud Storage—Overview," Sep. 6, 2016, <https://documentation.commvault.com/commvault/v10/article?p=features/cloud_storage/cloud_storage_overview.htm>, (1 page).
Commvault Systems(R) Inc., "Deduplication Database Backup and Recovery," Aug. 18, 2016, <https://documentation.commvault.com/commvault/v10/article?p=features/deduplication/c_ddb_backup_and_recovery.htm> (13 pages).
Commvault Systems(R) Inc., "Deduplication Overview," Aug. 18, 2016, <https://documentation.commvault.com/commvault/v10/article?p=features/deduplication/c_deduplication_overview.htm> (3 pages).
Commvault Systems(R) Inc., "Simpana Software Capabilities," Aug. 18, 2016, <https://documentation.commvault.com/commvault/v10/article?p=whats_new/c_commcell_features.htm> (5 pages).
Commvault Systems(R) Inc., "Simpana Software Overview," Aug. 18, 2016, <https://documentation.commvault.com/commvault/v10/article?p=whats_new/c_main_overview.htm>(2 pages).
Dr. M. Elkstein, Learn REST: A Tutorial—http://rest.elkstein.org/ dated on or before Oct. 11, 2017 (5 pages).
EMC Corporation, "EMC Data Protection Solutions for Public Cloud Environments," Dec. 2015, <http://www.emc.com/collateral/white-papers/h14643-emc-data-protection-solutions-public-cloud-wp.pdf> (31 pages).
EMC Corporation, "Long Term Retention to Cloud," May 2016, EMC World 2016, <http://www.emc.com/en-us/microsites/virtual/word/index.htm> (41 pages).
Fielding Dissertation: Chapter 5: Representational State Transfer (REST)—https://www.ics.uci.edu/~fielding/pubs/dissertation/rest_arch_style.htm, 2000 (16 pages).
Fu et al., "Application-aware local-global source deduplication for cloud backup services of personal storage," 2014, IEEE Transactions on Parallel and Distributed Systems, vol. 25, No. 5 (2014), pp. 1155-1165, <https://www.researchgate.net/publication/261567175_Application-Aware_Local-Global_Source_Deduplication_for_Cloud_Backup_Services_of_Personal_Storage>.
Garry Kranz, "Tintri Cloud Connector writes VM backups to AWS, IBM," Aug. 17, 2017, SearchCloudStorage.com, <http://searchcloudstorage.techtarget.com/news/450424670/Tintri-Cloud-Connector-writes-VM-backups-to-AWS-IBM?vgnextfmt=print> (1 page).
Google, "Bucket and Object Naming Guidelines," Aug. 19, 2016, <https://cloud.google.com/storage/docs/naming> (3 pages).
Google, "Key Terms," Aug. 19, 2016, Google Cloud Platform, Cloud Storage, Documentation, <https://cloud.google.com/storage/docs/key-terms> (3 pages).
Hewlett Packard Enterprise Development LP., "QuickSpecs," HPE StoreOnce Systems, May 27, 2016, <http://www8.hp.com/h20195/v2/GetPDF.aspx/c04328820.pdf> (49 pages).
Michael Ratner, "Better Object Storage With Hitachi Content Platform," Nov. 2014, <https://www.hds.com/en-us/pdf/white-paper/hitachi-white-paper-introduction-to-object-storage-and-hcp.pdf> (28 pages).
Rubrik, Inc., "Rubrik Converged Data Management | Technology Overview & How It Wotks," 2015, <http://www.rubrik.com/content/uploads/2015/05/Rubrik-Converged-Data-Management-Tech-Overview-and-How-It-Works-White-Paper.pdf> (7 pages).
ScriptingGuy1 et al., "How Can I Get a List of All the Files in a Folder and Its Subfolders?," Oct. 20, 2004, Hey, Scripting Guy! Blog, <https://blogs.technet.microsoft.com/heyscriptingguy/2004/10/20/how-can-i-get-a-list-of-all-the-files-in-a-folder-and-its-subfolders/> (19 pages).
Todd et al., U.S. Appl. No. 15/267,899 entitled Acquisition of Object Names for Portion Index Objects filed Sep. 16, 2016 (50 pages).
Wikipedia, Representational state transfer last edited on Oct. 10, 2017 (7 pages).
Yan, F. et al., "A Method of Object-based De-duplication," (Research Paper), Dec. 2011, https://pdfs.semanticscholar.org/4c1e/88b57f4b899a637a5844fa813efb12d2b17e.pdf (8 pages).
Amazon Web Services, Inc., "GET Bucket (List Objects) Version 2," Jul. 12, 2016, AWS Documentation, Amazon Simple Storage Service (S3), <https://web.archive.org/web/20160712175256/https://docs.aws.amazon.com/AmazonS3/latest/API/v2-RESTBucketGET.html>.
Amazon Web Services, Inc., "Listing Keys Hierarchically Using a Prefix and Delimiter," May 1, 2016, AWS Documentation, Amazon Simple Storage Service (S3), <https://web.archive.org/web/20160501072739/https://docs.aws.amazon.com/AmazonS3/latest/dev/ListingKeysHierarchy.html>.
Amazon Web Services, Inc., "Listing Object Keys," May 1, 2016, AWS Documentation, Amazon Simple Storage Service (S3), <https://web.archive.org/web/20160501073231/https://docs.aws.amazon.com/AmazonS3/latest/dev/ListingKeysUsingAPIs.html>.
RestApiTutorial.com, "Using HTTP Methods for RESTful Services," Apr. 14, 2016, <https://web.archive.org/web/20160414112534/https://www.restapitutorial.com/lessons/httpmethods.html>.
RESTfulAPI.net, "HTTP Methods," Jun. 8, 2016, RESTful API Tutorial, <https://web.archive.org/web/20160608220652/https://restfulapi.net/http-methods/>.
Srikanth Venkata Seshu, "5 advantages HP StoreOnce Backup brings to cloud service providers," Sep. 21, 2014, <https://community.hpe.com/t5/Around-the-Storage-Block/5-advantages-HP-StoreOnce-Backup-brings-to-cloud-service/ba-p/6794333#.W1HrqNJKiUk>.

\* cited by examiner

BACKUP ITEM METADATA INCLUDING RANGE INFORMATION

BACKGROUND

A computer system may store data in local storage of the computer system. In some examples, the data may also be stored in a remote data backup system that is in communication with the computer system. In such examples, the data may be retrieved from the data backup system when the data is lost, corrupted, or otherwise becomes inaccessible at the local storage of the computer system, for example.

BRIEF DESCRIPTION OF THE DRAWINGS

The following detailed description references the drawings, wherein.

DETAILED DESCRIPTION

Figure 1:
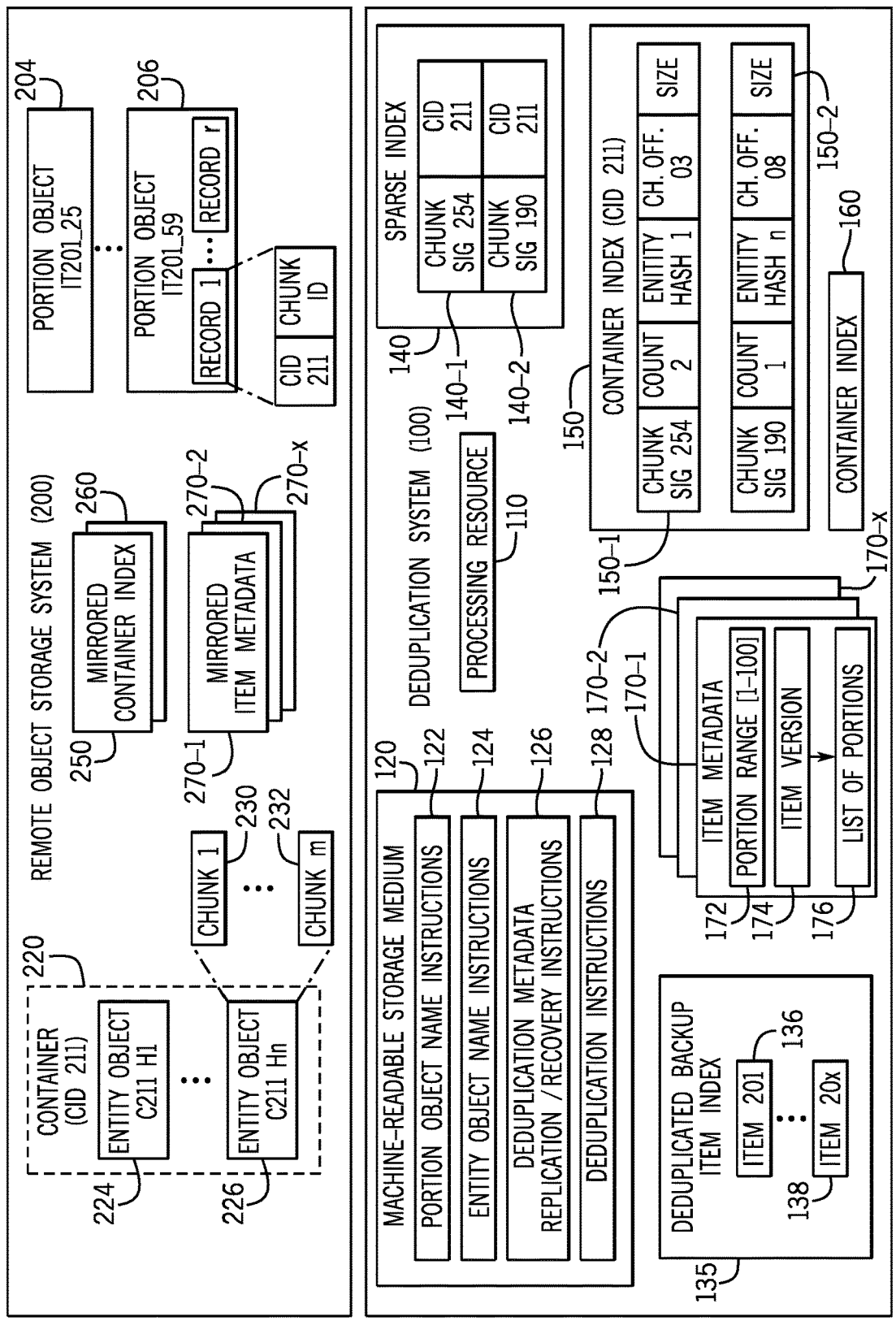
FIG. 1 is a block diagram of a computing environment including a deduplication system to generate deduplication metadata, and a remote object storage system, according to some examples.

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

As described above, data stored in local storage of a computer system may also be stored in a remote data backup system that is in communication with the computer system. In some examples, the data backup system may deduplicate data provided for backup in order to store the data using less space than would be occupied by the full data (i.e., in non-deduplicated form). In examples described herein, a process of deduplication performed by a data backup system (or other system) on a collection of data (referred to herein as a "stream" of data) may include breaking the stream into portions of data referred to herein as "chunks", identifying chunk(s) of the stream that have content identical to the content of another chunk of the stream (or previous streams), storing one (full or compressed) copy of that identical content, and storing references to that one copy of the identical content for chunk(s) of the data stream that include that content. In this manner, a deduplication process may avoid or reduce storing "duplicate" copies of chunks of a stream of data, and instead store a single copy of data content that is identified as having duplicates in the stream of data. In such examples, the system performing the deduplication may store metadata including, for each chunk in the data stream, a reference to the stored copy of the content the chunk. Such metadata may enable reconstruction of the original, full version of the stream of data by the system by traversing the metadata and, for each reference to a stored copy of data, providing the full content of data that the reference points to.

In some examples, deduplication can remove all duplicate copies of chunks such that just a single instance of each unique chunk is stored. In other examples, deduplication can remove some duplicate copies of chunks, but can allow some chunks to be duplicated when stored. Chunk duplication may be performed in some cases to reduce fragmentation of stored data, for example.

For disaster recovery purposes (such as when a failure results in data loss, whether partial or complete) or for recovery from other events (such as power loss or fault during a write or store operation), it may be desirable to store data and metadata embodying a deduplicated stream of data at a storage location (e.g., backup system) that is remote from a deduplication system (also referred to as a "local system" or "local deduplication system") that performed the deduplication, so that the deduplicated stream may be restored from the remote storage. Examples described herein may structure and store deduplicated data and metadata in a remote object storage system (such as a cloud object storage system) such that deduplicated streams of data, or portions thereof, may be restored from the remote object storage system by a local deduplication system efficiently after a data loss at the local deduplication system.

Additionally, to efficiently perform deduplication, a deduplication system may create and utilize various types of deduplication metadata for determining whether a given chunk of data has been seen previously in a data stream to be backed up, and thus may be considered a duplicate chunk whose content can be omitted from being stored again. In such examples, this deduplication metadata may be continually updated while processing a data stream, including adding new metadata or mappings for chunks of data and adjusting reference counts for chunks of data, for example.

It may also be desirable to recover this deduplication metadata in a recovery situation (e.g., after a data loss, when another deduplication system is to be used after a failure of another, or when a fault or power loss has interrupted a write or store operation).

In addition to recovering deduplication metadata, it may be desirable to determine an object name of a portion object of a backup item that has already been used. A backup item refers to a collection of data (such as a stream of data, a data file, etc.) that is to be stored in a data backup system (remote object storage system). A backup item can be divided into multiple portions. Each portion of the backup item is referred to by a corresponding portion object, where each portion object can refer to a respective group of chunks. A group of chunks can include one chunk or multiple chunks. A portion object includes records that contain metadata referring to the chunks of the corresponding portion of the backup item.

An "object name" refers to any identification information (including text, numerals, and/or symbols) that can be used to uniquely identify a respective object, such as the portion object of a backup item, or another type of object.

Determining an object name of a portion object that has already been used allows a deduplication system to avoid reusing the same object name for another portion object. In this way, the deduplication system can avoid overwriting a backup item portion referred to by a given object name that has already been used.

The risk of reusing a given object name and overwriting the corresponding backup item portion having this given object name can exist if a remote object storage system uses eventual consistency. An eventually consistent storage system is one in which after a particular object is written to the storage system, a request to obtain a list of objects that is submitted to the storage system may not result in a response that includes a list that includes an object name of the particular object. If the request to obtain a list of objects is submitted too soon after the write of the particular object to the storage system, consistency may not yet have been reached, such that the response to the request returns a list of objects that excludes the particular object. After some amount of time has passed, the storage system will become eventually consistent, in which case a request to obtain a list of objects will include the particular object.

An example of an eventually consistent storage system is a storage system that has multiple storage nodes. A particular object written to a first storage node of the multiple storage nodes eventually is replicated to a second storage node of the multiple storage nodes. Thus, after the particular object is written to the first storage node, a list request submitted to the second storage node may result in the second storage node returning a list that does not include the particular object, if the request is received prior to the eventual replication of the particular object from the first storage node to the second storage node.

Not returning the object in a list request is one example of eventual consistency. Another example would be where the deduplication system updates (overwrites) an existing object in the remote object storage system with new data and then the deduplication system reads back the object. In this latter case, eventual consistency dictates that the response to the read could be the old data or the new data. If the read occurs too quickly after the update, then the remote object storage system is not yet consistent, and thus would return the old data.

In accordance with some implementations of the present disclosure, in response to an event at a deduplication system, a determination is made of an object name of a portion object of a backup item that has already been used. The event can include a disaster event, a fault event, or any other type of event. A disaster event can include, for example, a failure that causes partial or complete data loss at the deduplication system. The failure can be a failure of the deduplication system, or a portion of the deduplication system. The failure can also be of machine-readable instructions (software and/or firmware) in the deduplication system. A fault event can include a fault or power loss during a write from the deduplication system to a remote object storage system. By being able to determine the object name of the portion object that has already been used, a recovery deduplication system (which can be the same deduplication system at which the event occurred or a different deduplication system) is able to avoid using the same object name to write further data, which reduces the likelihood of overwriting an object portion assigned the object name.

In addition, in further implementations of the present disclosure, for an entity object stored at the remote object storage system, a hash value can be used in an object name of the entity object. An entity object is explained further below. By using the hash value in the object name of the entity object, it can be ensured that the object name of the entity object is unique and thus overwriting of an entity object can be avoided. Additionally, in additional implementations of the present disclosure, certain deduplication metadata at the deduplication system can be mirrored (replicated) to the remote object storage system. An example of such replicated deduplication metadata is a container index. The concepts of a container and a container index are discussed further below. By replicating the deduplication metadata at the remote object storage system, the replicated deduplication metadata can be retrieved for recovery at the deduplication system. In addition, the retrieved deduplication metadata can be used to relatively efficiently reconstruct other deduplication metadata, such as a sparse index (discussed further below).

Referring now to the drawings, FIG. 1 is a block diagram of an example computing environment including a deduplication system 100 (a local system) to generate deduplication metadata including a sparse index 140 and container indexes 150, 160. The computing environment also includes a remote object storage system 200, such as a cloud object storage system 200. The deduplication system 100 can be implemented as a single computing node or as an arrangement of multiple computing nodes. The remote object storage system 200 can also be implemented as a single computing node or as an arrangement of multiple computing nodes.

In some examples described herein, an object storage system is a system that stores data in the form of objects having object names and that does not enable arbitrary editing of stored objects. For example, an object storage system may not enable editing of any data stored in an object. In some examples, the object storage system may enable appending new data to a stored object. In other examples, the object storage system may not enable appending new data to an object. In some examples, an object storage system may not enable truncating a stored object. In some examples, the object storage system may store data as immutable objects and not enable editing data of a stored object, appending to a stored object, or truncating a stored object. Although an object may be replaced in the object storage system, an eventually consistent object storage system would not guarantee the version read back after object replacement.

In some examples, the object storage system may be a remote object storage system in that the object storage system is "remote" from a deduplication system that stores objects in the object storage system. In examples described herein, a remote object storage system may not be local to (or locally attached to) the deduplication system, but may instead be accessible to the deduplication via a computer network such as, for example, a local area network (LAN), a virtual LAN (VLAN), a wireless local area network (WLAN), a virtual private network (VPN), the Internet, or the like, or a combination thereof. In some examples, the remote object storage system may be a "cloud" object storage system that is remote from the deduplication system (and may be referred to herein as a "remote cloud object storage system").

In the example of FIG. 1, deduplication system 100 may include a physical network interface (not shown) for communication on a computer network. Deduplication system 100 may include at least one processing resource 110, and at least one non-transitory machine-readable storage medium 120 comprising (e.g., encoded with) machine-readable instructions (including instructions 122, 124, 126, and 128) that are executable by the at least one processing resource 110 of deduplication system 100 to implement functionalities described herein in relation to FIG. 1. The processing resource 110 can include a processor or multiple processors. A processor can include a microprocessor, a core of a multi-core microprocessor, a microcontroller, a programmable integrated circuit, a programmable gate array, or another hardware processing circuit.

In examples described herein, a process of data deduplication (or "deduplication" herein) may involve splitting a collection of data (referred to as a "stream" herein) into "chunks" of identifying duplicate chunks of backup data, storing one copy of identified duplicate chunk of data, and maintaining metadata that enables reconstruction of the original, full version of the backup data from the stored deduplicated data. Such metadata may include, for each duplicate chunk of data that is identified, a reference to a stored portion of the data, for example.

The example of FIG. 1 illustrates a deduplication system 100 that stores deduplication metadata, including a sparse index 140 and container indexes 150, 160. Aspects of the structure and use of sparse index 140, container indexes 150, 160, and data in remote object storage system 200 will first be described below, in accordance with some examples. For purposes of explanation, it will be assumed that sparse index 140, container indexes 150, 160, and deduplicated backup item index 135 (or "backup item index" 135) are currently present in storage of deduplication system 100, such as at least one machine-readable storage medium.

In some examples, deduplication instructions 128 may begin receiving a stream of data to deduplicate and store in remote object storage system 200. A stream or a portion of the stream may be associated with one or more backup items that are deduplicated by deduplication system 100. In the example of FIG. 1, the deduplicated backup item index 135 includes, for example, a backup item entry 136 that may correspond to a particular collection or stream of data on which deduplication system 100 has performed, will perform, or is in the process of performing deduplication. In the example of FIG. 1, the deduplicated backup item index 135 also includes a backup item entry 138, and may include additional, fewer, or other backup items entries. In examples, backup item entries represent different collections or streams of data that may be restored by deduplication system 100 in whole or in part. In the example of FIG. 1, backup item entry 136 includes a backup item identifier (ID) "201" that identifies a deduplicated backup item, and backup item entry 186 includes a backup item ID "20x" that identifies another deduplicated backup item (x being an integer to represent a number greater than or equal to one of backup items referred to by the deduplicated backup item index 135).

In the example of FIG. 1, deduplication system 100 may begin to acquire a stream of data associated with a particular backup item, such as backup item associated with backup item ID "202", for example. Deduplication instructions 128 may begin a deduplication process on the stream once a section of the stream of a threshold size has been buffered at deduplication system 100, such as a 20 MB section of the stream (or any other suitable amount of the stream). Deduplication instructions 128 may then split that section of the stream into respective chunks of a fixed size (e.g., approximately 4K) or a variable size, and then obtain a chunk signature for each chunk by applying an appropriate signature function to the content of the chunk to obtain a chunk signature as a result. In some examples, the signature function may be a hash function, and the chunk signature may be a hash (also referred to as a hash value) of the chunk generated by applying the hash function on the chunk. Any suitable hash function may be used to generate the chunk signature. In other examples, any other suitable type of signature function may be used as a hash function to generate an appropriate chunk signature (e.g., a function to generate a suitable type of fingerprint).

Using the chunks and chunk signatures, deduplication instructions 128 may further determine whether the content of any of the chunks have been backed up previously for a given deduplication domain (i.e., a given growing set of data against which deduplication is performed). In examples described herein, this process may be referred to as a process of determining whether a given chunk is a "match" to a chunk already stored in the given deduplication domain. In examples described herein, deduplication instructions 128 may utilize sparse index 140 and container indexes 150, 160 to relatively efficiently determine whether or not each given chunk matches a previously stored chunk. Prior to providing a description of the matching process itself, the manner in which data and metadata are stored in a remote object storage system is first described below for context.

In the example of FIG. 1, for each chunk in the stream, deduplication instructions 128 may determine whether a chunk is found to be a match to a chunk already encountered or backed up in the given deduplication domain (as described below). In the example of FIG. 1, if deduplication instructions 128 do not find a chunk to be a match to a previously encountered chunk, then deduplication instructions 128 may buffer that chunk for upload to the remote object storage system 200. If deduplication instructions 128 do find the chunk to be a match to a previously encountered chunk, then deduplication instructions 128 will not buffer the chunk for upload (as a duplicate chunk has already been stored or buffered).

Note that the deduplicated chunks produced by the deduplication instructions 128 are stored in the remote object storage system 200 and not in the deduplication system 100.

Each backup item (including backup item 201 or 20x) is divided into portions by deduplication instructions 128, where each respective portion includes a group of chunks of the backup item, and the chunk(s) of the respective portion are referred to by records in a corresponding portion object.

In FIG. 1, portion objects 204, 206, etc. are stored in the remote object storage system 200. In some examples, the portion objects 204 and 206 created by the deduplication instructions 128 are sent to the remote object storage system 200 for storage at the remote object storage system 200. Note that the portion objects 204 and 206 are not stored in the deduplication system 100. Although two portion objects 204 and 206 are shown in FIG. 1, it is noted that a smaller number or larger number of portion objects can be stored in the remote object storage system 200, and the number can change over time.

The storage of chunks and portion objects in the remote object storage system 200 will now be described in more detail below. In the example of FIG. 1, for each chunk of the stream that is not found to be a match, deduplication instructions 128 may buffer the chunk for storage in remote object storage system 200. When the group of buffered chunks reaches a certain size (e.g., approximately 128K, or any other suitable size), deduplication instructions 128 may store the group of buffered chunks in remote object storage system 200 as an entity object, which is an individual object of the remote object storage system 200. Referring to FIG. 1, for example, deduplication instructions 128 may buffer a group of chunks including chunks 230, 232, etc., and store the chunks as an entity object 226 in remote object storage system 200. Deduplication instructions 128 may store multiple entity objects in remote object storage system 200, such as entity objects 224, 226, etc. Each entity object includes a different plurality of chunks. Although FIG. 1 illustrates two entity objects stored in remote object storage system 200, more or fewer entity objects may be stored in remote object storage system 200 (and the number may change over time).

Note that the records of each portion object 204, 206 refers to chunks of the entity objects. Whereas the entity objects 224, 226 store the chunks of deduplicated data, the portion objects refer to such chunks. The entity objects 224, 226 are also not stored in the deduplication system 100.

In the example of FIG. 1, entity objects stored in remote object storage system 200 are associated with containers. In examples described herein, a container may be a logical association of entity objects, which may be beneficial for efficiency of deduplication matching decisions. Each container may have an assigned container identifier (ID), and may be associated with a given container index associated with the same container ID, as described further below. For example, in the example of FIG. 1, a container 220 having container ID 211 may be a logical grouping of entity objects including at least entity objects 224, 226 of remote object storage system 200.

Additionally, in the example of FIG. 1, each portion object 204 or 206 includes records referring to chunks that make up a respective backup item portion. As shown in FIG. 1, the portion object 206 includes records 1 to r (r≤1). Each respective record of a portion object refers to a respective chunk and includes a container ID and a chunk ID. The container ID identifies the container that the entity object including the respective chunk is part of, and the chunk ID points to a specific entry within a container index (e.g., 150 or 160), where a container index can include multiple entries.

More generally, each record of each portion object may include metadata sufficient to access (e.g., retrieve) the chunk that the respective record represents.

For portion objects, when enough records are buffered to cover a certain size of data range (e.g., 100 MB, 1 GB, or any other suitable amount), or the end of the stream in reached, then deduplication instructions 128 may store the group of buffered records in remote object storage system 200 as a portion object, which is an individual object of the remote object storage system 200. Referring to FIG. 1, for example, deduplication instructions 128 may buffer a group of records 1 to r, and store the records as the portion object 206 in remote object storage system 200. Deduplication instructions 128 may store multiple portion objects in remote object storage system 200, such as portion objects 242, 204, 206, each including records of metadata for chunks of a given data range of a given backup item.

In examples described herein, each object stored in a remote object storage system may be assigned an object name by which the object may be accessed in the remote object storage system. For example, in the example of FIG. 1, each of entity objects 224, 226 is assigned an entity object name. In examples described herein, entity object name instructions 124 in the deduplication system 100 assign each entity object a name that is based on the container ID for the container the entity object is assigned to (i.e., logically associated with) and a hash of the content of the entity object. For example, a hashing function can be applied to the content of the entity object, where the content can include the chunks (or a portion of the chunks) of the entity object. The hashing function applied to the content of the entity object produces a hash value that is included in the name of the entity object. Any suitable hash function may be used to generate the entity object hash value. In other examples, any other suitable type of signature function may be used as a hash function to generate a hash value based on the content of the entity object.

In further examples, the entity object name may include other information, such as an alphanumeric tag. In the example of FIG. 1, for example, entity object name instructions 124 may construct an entity object name to include a "C" (for container ID) followed by the container ID, and include an "H" (for hash) followed by the hash value. For example, in the example of FIG. 1, a hash function applied on the content of entity object 224 produces a hash value "1". Since the entity object 224 is part of container 220 having container ID "211", the entity object name for the entity object 224 is "C211H1", including the container ID "211" for container 220 and its hash "1". In like manner, a hash for entity object 226 is "n", and the entity object name assigned to entity object 226 is "C211Hn". Although in the example of FIG. 1, the entity object names are constructed with a leading tag "C" before the container ID and a leading tag "H" before the hash value, in other examples the leading tags may be different or omitted, and other information, demarcation, or the like, may be included in the object names along with the container ID and hash value. In examples described herein, containers are not objects stored in the remote object storage system 200, but are instead a logical grouping of entity object(s) that are objects of the remote object storage system 200. In such examples, containers do not have any object name, though they are assigned a container ID, as described above.

In addition to including a hash value within the name of a given entity object, examples of other information that can be further encoded into the entity object name can include information of other entity objects that are part of the same set (e.g., part of the same container) as the given entity object. For example, assume entity objects A, B, C, and D are part of a set (e.g., part of container 220). The name of entity object A can include information of the other entity objects (B, C, D), such as the name or other metadata of each of entity objects B, C, and D. For example, the name of entity object A can be A-B-C-D, the name of entity object B can be B-A-C-D, the name of entity object C can be C-A-B-D, and the name of entity object D can be D-A-B-C. In this manner, based on the name of entity object A, deduplication system 100 can expect entity objects B, C, and D to also exist.

In further examples, in addition to encoding set membership into names of entity objects as noted above, version information can also be included within the name of an entity object. For example, given that entity object A has name A-B-C-D, if any of entity objects A, B, C, and D are modified, then a new version information can be encoded into the name of entity object A, such as A-B-C-D-1, where the "1" at the end is a version indicator that is advanced each time a modification is made to any of the entity objects in the set.

In examples described herein, each portion object stored in a remote object storage system may also be assigned a portion object name by which the portion object may be accessed in the remote object storage system. For example, in the example of FIG. 1, each of portion objects 204, 206, may be assigned a portion object name. In examples described herein, portion object name instructions 122 may assign each portion object a name that is based on an associated backup item ID and a portion number that increments for each successively created portion object. For example, if the portion number for a current portion object is y, then the portion number for a subsequently created portion object is y+1. In some examples, for each portion object uploaded to remote object storage system 200, portion object name instructions 122 may assign the portion object a name that includes a backup item ID of an associated backup item that is at least partially represented by metadata of the portion object, and that includes the portion number (that has been incremented).

A portion object is written just once to remote object storage system 200, and a name of a portion object is not reused.

In further examples, the portion object name may include other information, such as an alphanumeric tag, or the like. In the example of FIG. 1, for example, portion object name instructions 122 may construct a portion object name to include a string "IT" (for backup "item") followed by the backup item ID, and include a portion number.

For example, in the example of FIG. 1, portion object 204 may be assigned an object name "IT201_25", which includes backup item ID "201" identifying a backup item, and which includes the portion number "25". In such examples, the tag "IT" may identify "201" as a backup item ID, and the portion number in the name may be demarcated by underscore characters. In other examples, other suitable tags and demarcation formats may be used. Also in the example of FIG. 1, portion index object 206 may be assigned an object name of "IT201_59", which includes backup item ID "201" identifying the backup item, and which includes portion number "59".

Although in the example of FIG. 1, the portion object names are constructed with a leading tag "IT" before the backup item ID and underscore demarcations, in other examples the leading tag may be different or omitted, and other information, demarcations, or the like, may be included or used in the portion index object names along with the backup item ID and data range information. Also, in other examples, instead of using portion numbers that are incremented for successive portion objects, portion numbers can be decremented as successively portion objects are created. More generally, portion numbers or other identifier values of portion objects can be advanced (incremented or decremented) as successively portion objects are created.

In other examples, alphabet characters, alphanumeric strings, or other portion identifier values can be used, where such portion identifier values are changed (incremented, decremented, or subject to another change) with successively created portion objects. Although example numbers used herein for identifiers, offsets, and the like, are provided for illustrative and explanatory purposes, actual numbers used in implementations of examples described herein may be different in length, values, format, etc., while being used in manner consistent with examples described herein.

As further shown in FIG. 1, the deduplication system includes multiple item metadata 170-1, 170-2, 170-x, where each item metadata 170-i (i=1 to x) corresponds to a respective backup item 136, 138, etc., that is subject to deduplication by the deduplication instructions 128.

The item metadata 170-1 includes portion range information 172 indicating a range of identifier values (e.g., the portion numbers) for portion objects of the backup item stored in remote object storage system 200. In the example of FIG. 1, the portion range information 172 is "[1-100]," which indicates that the range of identifier values (e.g., the portion numbers) for portion objects associated with the backup item 136 is in the range between 1 and 100. In the example shown in FIG. 1, the portion number of the portion object 204 is "25", while the portion number of the portion object 206 is "59", which are both within the range [1-100]. Note that although the portion range information 172 indicates that portion objects with portion numbers 1 to 100 are possibly stored in the remote object storage system 200, that does not mean that all such portion objects are stored in the remote object storage system 200. For example, a portion object within the range may have been deleted from remote object storage system 200.

As noted above, remote object storage system 200 is an eventually consistent storage system. In such an eventually consistent storage system, if a request to list objects, such as the portion objects, stored in remote object storage system 200 is submitted to remote object storage system 200, then the remote object storage system 200 may respond with a list that does not include the latest portion object(s) written to remote object storage system 200.

However, by using the portion range information 172 of the item metadata 170-1, the portion object name instructions 122 is able to submit individual retrieval requests to obtain attribute information of portion objects that are present in the eventually consistent remote object storage system 200. An individual retrieval request causes remote object storage system 200 to search for the portion object that is being sought, such that the deduplication system can be assured that the portion object is present or not in remote object storage system 200. The portion range information 172 of the item metadata 170-1 allows the portion object name instructions 122 to submit individual requests for portion objects having portion identifiers within the specific range identified by the portion range information 172, such that deduplication system 100 does not send an unbounded number of portion object retrieval requests. In this way, a bounded query can be made for attribute information of portion objects for a particular backup item that is in remote object storage system 200.

In some examples, an individual retrieval request for a given portion object can include a RESTful (where REST stands for Representational State Transfer) GET Request. In other examples, other types of retrieval requests can be used.

By confirming the presence (or absence) of a portion object that has a corresponding portion object name, deduplication system 100 can make a determination of whether or not the corresponding portion object name has been used. In this way, the portion object name instructions 122 can avoid assigning a used portion object name to a newly created portion object, to avoid overwriting a portion object having the used portion object name.

As additional portion objects are created for a given backup item, the portion range information 172 of the item metadata 170-1 can be changed. For example, instead of [1-100], the portion range information 172 can be changed to [1-200] as portion objects with portion numbers greater than 100 are created.

In some examples, the item metadata 170-1 further includes an item version 174, which refers to a latest version of the backup item 136. If the backup item 136 is modified, then the item version 174 is updated to refer to the latest version of the backup item 136.

In some examples, the item version 174 in the item metadata 170-1 can refer to a list of portions 176 that make up the backup item 136.

In further examples, the item metadata 170-1 can include further metadata relating to the backup item 136.

The item metadata 170-2, 170-x for the other backup items include similar elements as the item metadata 170-1.

In accordance with some implementations of the present disclosure, the item metadata 170-1, 170-2, 170-x stored in deduplication system 100 are replicated to remote object storage system 200 as respective mirrored item metadata 270-1, 270-2, 270-x.

Also, the container indexes 150, 160 are also replicated to remote object storage system 200 as respective mirrored container indexes 250, 260.

If the item metadata 170-1, 170-2, 170-x and/or the container indexes 150, 160 are lost or corrupted at deduplication system 100 for any reason, then the mirrored item metadata 270-1, 270-2, 270-x and/or the mirrored container indexes 250, 260 can be retrieved from remote object storage system 200 to recover the item metadata and/or container indexes at deduplication system 100.

Returning now to a description of a chunk matching process that may be performed by deduplication system 100 in accordance with examples described herein, deduplication system 100 may utilize the sparse index 140 and virtual container indexes 150, 160 in performing a chunk matching process of an overall deduplication process (i.e., when performing deduplication on a stream of data). In examples described herein, deduplication system 100 may store (in local storage of system 100) container indexes 150, 160, including a respective container index for each container associated with entity objects stored in remote object storage system 200. For example, the container index 150 may be the container index associated with container 220. In examples described herein, a container index that is associated with a given container of entity objects may be a container index that includes metadata for each chunk of each entity object of the given container. In some examples, the metadata for a chunk included in a container index entry (e.g., 150-1 or 150-2 in the container index 150) may include a chunk signature for the chunk, a reference count (indicating how many portion object records point to the chunk), an entity hash value of the entity object containing the chunk, and a chunk offset indicating where the chunk is located in the identified entity object, and a size of the chunk. In further examples, chunks may be compressed for storage in entity objects and, in such examples, a container index entry may include a compression code (indicating a compression methodology utilized) and both a compressed size of the chunk and an uncompressed size of the chunk.

In the example of FIG. 1, for example, container index 150, associated with container 220, may include metadata for each chunk of each entity object of container 220. For example, container index 150 may include respective container index entries 150-1, 150-2, etc., for each chunk of each of entity objects 224, 226, etc., associated with container 220. As an example, container index entry 150-1 may include metadata for chunk 230 of entity object 226 of container 220, such as chunk signature "254" for chunk 230, reference count 2 for chunk 230, entity hash 1 indicating the entity object within container 220 that includes chunk 230, chunk offset 03 indicating an offset within the entity object where chunk 230 is located, and a size of chunk 230. Similarly, container index entry 150-2 may include metadata for another particular chunk (e.g., chunk 232) of container 220, including a chunk signature "190", reference count 1, entity hash n, chunk offset 08, and size. Container index 150 may similarly contain container index entries for other chunks stored in an entity object associated with container 220.

In examples described herein, a container index and the container it is associated with may both be identified by the same container ID. For example, container 220 may be assigned a container ID of "211" and container index 150 (associated with container 220 as described above) may also be assigned (or otherwise associated with) the same container ID "211". Each other container index, such as container index 160, may be associated with a respective other container and include container index entries representing chunks of that other container, as described above for container index 150.

In examples described herein, deduplication system 100 may store (in local storage of system 100) sparse index 140 including entries mapping chunk signatures (e.g., hashes) to container identifiers. In examples described herein, sparse index 140 may not contain an entry for every chunk signature encountered in the deduplication domain, but may instead contain an entry for chunk signatures (of chunks processed for a given deduplication domain) that meet a sparse signature condition. In some examples, the sparse signature condition may be a condition that is met by a relative small number of all of the possible chunk signatures. For example, the sparse signature condition may be whether a given chunk signature (in a binary representation, for example) includes a particular bit pattern at a particular offset. For example, an example sparse signature condition may be met by each chunk signature having five zeroes ("0"s) in a row starting at a given bit position (or offset) of the chunk signature (e.g., starting at the fifth bit position). In other examples, other suitable sparse signature conditions may be used. In some examples, the sparse signature condition may be selected such that the chunk signatures that meet the condition may have a desirable statistical distribution over the universe of the possible chunk signatures in the deduplication domain. In examples described herein, a given sparse signature condition may be deterministic such that the sparse signature condition would always be met by the same set of chunk signatures.

In examples described herein, each of the entries 140-1, 140-2, etc., in sparse index 140 may include a mapping of a given chunk signature (meeting a given sparse signature condition) to a container ID of a container index including an entry for a chunk having the given chunk signature. For example, in the example of FIG. 1, entry 140-1 of sparse index 140 may include a chunk signature "254" (meeting a given sparse signature condition for sparse index 140) and may map the chunk signature "254" to a container ID having a value of "211", and which thereby indicates container index 150 that is assigned virtual container ID "211". In the example of FIG. 1, the container index 150 (that is assigned container ID "211") includes an entry 150-1 for chunk 230 having the chunk signature "254" of the sparse index entry 140-1. Similarly, entry 140-2 of sparse index 140 may include a chunk signature "190" and may map to the container ID having a value of "211". In such examples, each chunk signature of sparse index 140 may, in effect, point to one of the container indexes 150, 160.

A matching process of deduplication instructions 128 of deduplication system 100 is now described below with reference to the objects and indexes described above. In examples described herein, each of deduplicated backup item index 135, sparse index 140, and container indexes 150, 160 may be stored in storage of deduplication system 100 (e.g., at least one machine-readable storage medium of deduplication system 100).

In examples described herein, when performing deduplication of a stream of incoming data for a given backup item against a given deduplication domain, the number of chunk signatures seen and stored in the deduplication domain may be too great to compare a chunk signature for every incoming chunk against every previously seen chunk signature when searching for duplicates. As such, deduplication system 100 may utilize sparse index 140 and container indexes 150, 160 to make data-locality based decision of what collection of chunk signatures incoming chunks should be compared again.

As described above, deduplication system 100 may begin to acquire a stream of data associated with a particular backup item (e.g., a backup item associated with ID "201"), and deduplication instructions 128 may begin a deduplication process on the stream once a section of the stream of a threshold size has been buffered at deduplication system 100, such as a 20 MB section of the stream (or any other suitable amount of the stream). As described above, deduplication instructions 128 may then split that section of the stream into respective chunks of a fixed side (e.g., approximately 4K) or a variable size, and then obtain a chunk signature for each chunk by applying a given signature function to the content of the chunk to obtain a chunk signature as a result. The resulting plurality of chunk signatures for the new chunks may be referred to as "incoming" chunk signatures herein. Deduplication instructions 128 may then decide what previously stored chunk signatures to compare the incoming chunk signatures against using the sparse index 140 and container indexes 150, 160.

For example, deduplication instructions 128 may determine which of the incoming chunk signatures meet the sparse signature condition associated with the sparse index 140, and then look up in the sparse index 140 each of the incoming chunk signatures that meets the sparse signature condition to obtain the virtual container ID mapped to the incoming chunk signature in the sparse index 140 (if the incoming signature is present in the sparse index 140). In this manner, deduplication instructions 128 may obtain a list of container IDs for container indexes that include entries for incoming chunk signatures that meet the sparse signature condition. In such examples, the same container ID may be returned multiple times where incoming chunk signatures (meeting the sparse signature condition) map to the same virtual container ID in sparse index 140. In such examples, deduplication instructions 128 may then select at least one of the returned virtual container IDs and use the associated virtual container index(es) (i.e., "selected" container index(es)) for matching comparisons. For example, deduplication instructions 128 may select one of the container IDs (e.g., the one returned the greatest number of times), multiple of the container IDs (e.g., some number of the container IDs returned more times than others), or all of the returned container IDs, in a suitable manner. In such examples, for each of the selected virtual container IDs, deduplication instructions 128 may compare all of the incoming chunk signatures against all of the entries of the container index associated with the selected container ID, looking for chunk signature matches. In such examples, deduplication instructions 128 may determine that there is a chunk signature match when a comparison indicates that an incoming chunk signature is identical to a chunk signature of one of the entries of a selected container index. In such examples, a chunk signature match indicates that the incoming chunk has been stored previously where indicated in part by the metadata of the container index entry having the matching chunk signature.

In such examples, based on a comparison of each of the incoming chunk signatures against the chunk signature of each of the selected container indexes, deduplication instructions 128 may determine whether a chunk is found to be a match to a chunk already encountered or backed up in the given deduplication domain. As described above, if deduplication instructions 128 do not find an incoming chunk to be a match to a previously encountered chunk (based on signature matching as described above), then deduplication instructions 128 may buffer that chunk for upload to the remote object storage system 200, and buffer a record of metadata representing the chunk to be included in a portion object, as described above. If deduplication instructions 128 do find the incoming chunk to be a match to a previously encountered chunk (based on signature matching as described above), then deduplication instructions 128 will not buffer the chunk for upload (as a duplicate chunk has already been stored or buffered), but will instead buffer a record of metadata representing the chunk for inclusion in a corresponding record of the portion object, where the metadata in the record references the duplicate chunk (that has already been stored or buffered), and increment the reference count for the matching chunk signature in the container index having the chunk signature that matches the incoming chunk signature.

In some examples, deduplication system 100 may suffer a data loss for any of a number of different reasons, such as a failure of memory or storage (e.g., memory device failure, storage device failure), or suffer an issue that is resolved by re-imaging a computing device at least partially implementing deduplication system 100. In such examples, data stored in memory or storage of deduplication system 100 may be lost, such as item metadata **170-1, 170-2, 170-*x,* sparse index 140, container indexes 150, 160, and deduplicated backup item index 135. In such examples, the data stored in remote object storage system 200 may survive the data loss at deduplication system 100. In such cases, the mirrored item metadata 270-1, 270-2, 270-*x* can be retrieved to recover the respective item metadata 170-1, 170-2, 170-*x,* and the mirrored container indexes 250, 260 can be retrieved to recover the respective container indexes 150, 160. Once the item metadata 170-1, 170-2, 170-*x* are recovered, then the backup items (e.g., 136, 138, etc.) that should exist can be determined from the respective item metadata 170-1, 170-2, 170-*x,* and the deduplicated backup item index 135 can be rebuilt to refer to the items 136, 138, etc. The item metadata 170-1, 170-2, 170-*x* include the respective item IDs (e.g. 201 to 201-*x*), which is added to the deduplicated backup item index 135**.

In addition, the recovered container indexes 150, 160 can be used to rebuild sparse index 140. Each entry of the entries of the container indexes 150, 160 includes a corresponding chunk identifier. Each container index is associated with a corresponding container ID. From the foregoing information of each container index, the sparse index 140 can be rebuilt. For example, entry 140-1 of sparse index 140 can be recreated based on entry 150-1 of container index 150, and entry 140-2 of sparse index 140 can be recreated based on entry 150-2 of container index 150.

Entry 140-1 of sparse index 140 maps chunk signature "254" to container ID "211". Entry 150-1 of container index 150 includes chunk signature "254" that is part of the container index having container ID "211".

Similarly, entry 140-2 of sparse index 140 maps chunk signature "190" to container ID "211". Entry 150-2 of container index 150 includes chunk signature "190" that is part of the container index having container ID "211".

In some examples, the recovery can be performed by the same deduplication system 100 that caused writing of various objects and indexes to remote object storage system 200. In other examples, deduplication system 100 can perform the recovery based on objects and indexes written to remote object storage system 200 by a second deduplication system. In the latter examples, if there is a failure at the second deduplication system, then, in accordance with examples described herein, deduplication system 100 (which never had backup item index 135, sparse index 140, item metadata **170-1, 170-2, 170-*x,* and container indexes 150, 160) may recover backup item index 135, sparse index 140, item metadata 170-1, 170-2, 170-*x,* and container indexes 150, 160**, and continue to perform deduplication to the deduplication domain in the place of the second deduplication system.

Figure 2:
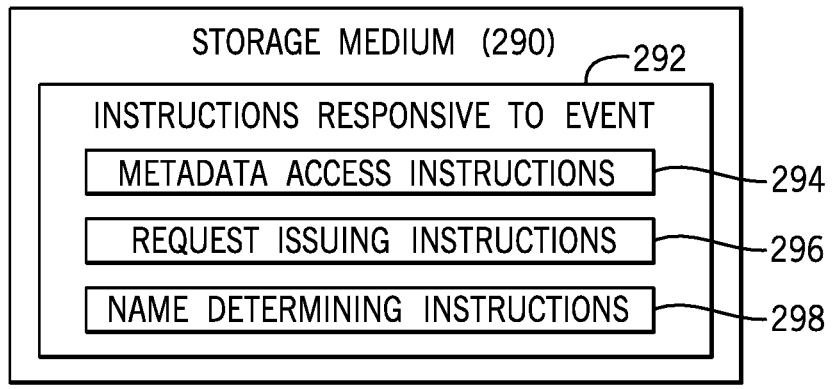
FIG. 2 is a block diagram of a storage medium storing instructions according to some examples.

FIG. 2 is a block diagram of a non-transitory machine-readable storage medium 290 that stores machine-readable instructions that upon execution cause deduplication system 100 to perform various tasks. The machine-readable instructions include instructions 292 that are executable in response to an event at deduplication system 100. The event includes any one or a combination of a power loss at the deduplication system, a fault, a failure, or a loss of data at the deduplication system. The instructions 292 include item metadata access instructions 294 to access item metadata (e.g., 170-1, 170-2, or 170-x of FIG. 1) of a backup item that is backed up to remote object storage system 100. The item metadata of the backup item includes range information (e.g., 172 in FIG. 1) indicating a range of identifier values for portion objects of the backup item stored in remote object storage system 200. The instructions 292 further include request issuing instructions 296 to issue, based on the range information, retrieval requests to obtain respective attribute information of the portion objects of the backup item stored in the remote object storage system.

Note that the attribute information that of each portion object retrieved can include attributes such as a size of the portion object, a last modified time of the portion object, and so forth. The attribute information retrieved in response to each retrieval request does not have to be the portion object itself, to reduce the amount of data retrieved in response to the retrieval requests.

In examples according to FIG. 1, assuming that the backup item of interest is the one with item identifier "201", then the retrieval requests can include a first retrieval request that specifies portion object name IT201_1, a second retrieval request that specifies portion object name IT201_2, a third retrieval request that specifies portion object name IT201_3, and so forth until a 100th retrieval request that specifies portion object name IT201_100 is issued. More generally, the retrieval requests that are issued by deduplication system 100 specify object names including identifier values (e.g., portion numbers) that are limited to within the range of identifier values indicated by the range information.

Remote object storage system 200 returns, in response to the first retrieval request, the attribute information of a first portion object of the backup item if the first portion object is stored in remote object storage system 200. However, remote object storage system 200 returns, in response to the second retrieval request, an indication that a portion object requested by the second retrieval request is not stored in the object storage system, if the portion object requested by the second retrieval request is not stored in the object storage system.

The instructions 292 further include name determining instructions 298 to determine, based on the attribute information, a name of a given portion object of the backup item already used. As noted above, this is to prevent overwriting a portion object having a name that is being used.

The determined name of the given portion object of the backup item already used includes an extremum (e.g., maximum or minimum) of the identifier value that is a latest identifier value produced by advancing (incrementing or decrementing) identifier values as portion objects are successively created. Once the extremum of the identifier value is determined, then the deduplication system 100 can determine that the next name for a portion object that can be used is the extremum advanced by a specified increment or decrement. For example, if the maximum identifier value used for portion objects of a backup item is 95, then the next identifier value that can be used in a portion object name is 96 (95+1).

Figure 3:
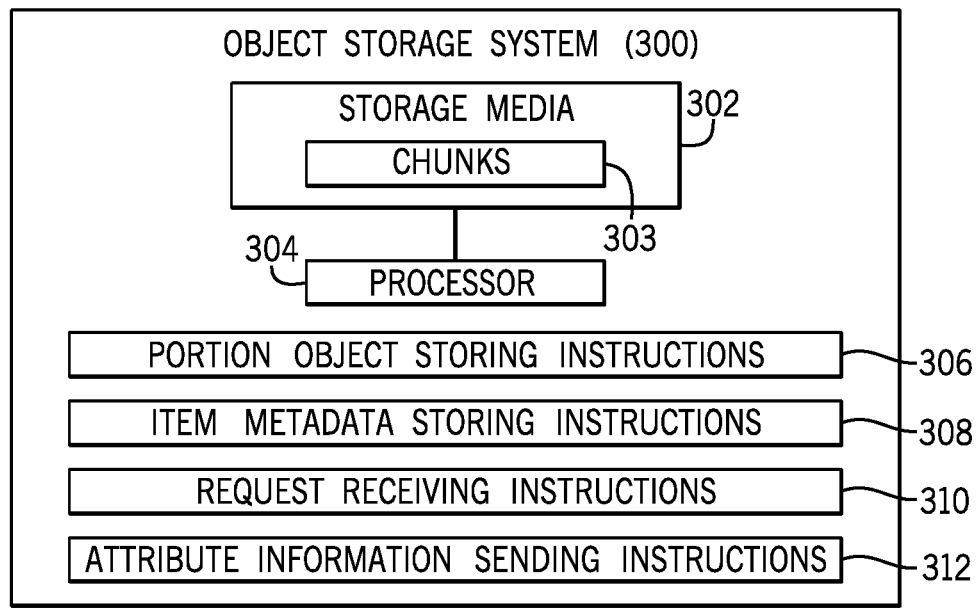
FIG. 3 is a block diagram of an object storage system according to further examples.

FIG. 3 is a block diagram of an object storage system 300 (e.g., the remote object storage system 200 of FIG. 1) including storage media 302 to store chunks 303 of backup items deduplicated by a deduplication system that is remote from the object storage system 300. The object storage system 300 includes a processor 304 and machine-readable instructions (which can be stored in the storage media 302 or other storage media) executable on the processor 304 to perform various tasks. Instructions executable on a processor can refer to instructions executable on a single processor or on multiple processors.

The machine-readable instructions include portion object storing instructions 306 to store portion objects of a first backup item of the backup items. The machine-readable instructions further include item metadata instructions 308 to store item metadata of the first backup item, the item metadata including range information indicating a range of identifier values for portion objects of the backup item, where the item metadata stored at the object storage system is a mirrored copy of corresponding item metadata stored at the deduplication system. The machine-readable instructions further include request receiving instructions 310 to receive, from the deduplication system, requests for respective attribute information of portion objects of the first backup item, the requests including portion object names including identifier values limited to identifier values within the range of identifier values. The machine-readable instructions additionally include attribute information sending instructions 312 to send the attribute information to the deduplication system in response to the requests.

Figure 4:
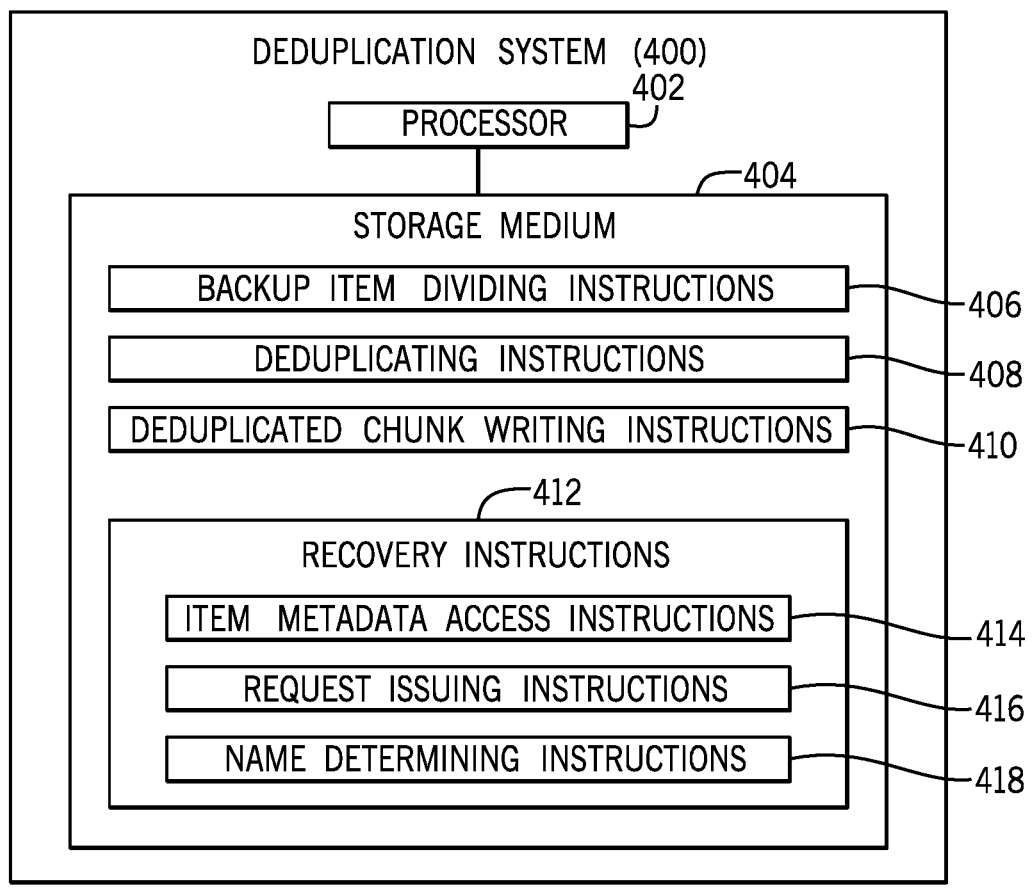
FIG. 4 is a block diagram of a deduplication system according to additional examples.

FIG. 4 is a block diagram of a deduplication system 400 (e.g., deduplication system 100 of FIG. 1) according to further examples. The deduplication system 400 includes a processor 402 and a non-transitory storage medium 404 storing machine-readable instructions executable on the processor 402 to perform various tasks. The machine-readable instructions include backup item dividing instructions 406 to divide a backup item into a plurality of chunks, deduplicating instructions 408 to deduplicate the plurality of chunks to produce deduplicated chunks, and deduplicated chunk writing instructions 410 to write the deduplicated chunks to a remote object storage system to backup the backup item in the remote object storage system.

The machine-readable instructions further include recovery instructions 412 to perform a recovery process. The recovery instructions 412 include item metadata access instructions 414 to access item metadata of the backup item, the item metadata including range information indicating a range of identifier values for portion objects of the backup item. The recovery instructions 412 further include request issuing instructions 416 to issue requests to obtain respective attribute information of the portion objects of the backup item, the requests including portion object names including identifier values that are within the range of identifier values. The recovery instructions 412 further include name determining instructions 418 to determine, based on the attribute information, a name of a given portion object of the backup item already used.

All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A non-transitory machine-readable storage medium storing instructions that upon execution cause a deduplication system to:

in response to an event at the deduplication system:
  access item metadata of a backup item that is backed up to a remote object storage system, wherein:
    the backup item includes portion objects, wherein each portion object represents a given data range of the backup item and includes records that contain metadata sufficient to access respective chunks of the given data range of the backup item, and each portion object is assigned a portion object name by which to access the portion object in the remote object storage system, each portion object name of each portion object including a respective identifier value within a given range of identifier values and including other information; and
    the item metadata of the backup item includes range information indicating the given range of identifier values containing each of the identifier values used in the respective portion object names of the portion objects of the backup item that are stored in the remote object storage system;
  issue, based on the range information, requests to obtain respective attribute information of the portion objects stored in the remote object storage system, wherein the requests comprise a first request including a first portion object name, and a second request including a second portion object name;
  receive, responsive to the first request, attribute information of a first portion object of the portion objects;
  receive, responsive to the second request, an indication that a second portion object corresponding to the second portion object name is not stored by the remote object storage system; and
  determine, based on the respective attribute information responsive to the requests, a given portion object name that has already been used for a given portion object of the backup item; and
wherein the instructions upon execution cause the deduplication system to:
  generate the portion object names for the portion objects of the backup item using the identifier values, the identifier values generated by successively advancing a portion number as each of the portion objects is successively created, wherein the portion object name for each of the portion objects includes a respective one of the identifier values.

2. The non-transitory machine-readable storage medium of claim 1, wherein advancing the portion number comprises incrementing the portion number or decrementing the portion number.

3. The non-transitory machine-readable storage medium of claim 1, wherein the determined given portion object name of the given portion object of the backup item includes an extremum identifier value that is a latest portion number produced by the advancing.

4. The non-transitory machine-readable storage medium of claim 1, wherein the instructions upon execution cause the deduplication system to:
  based on the determined given portion object name that has already been used for the given portion object of the backup item, avoid overwriting the given portion object of the backup item.

5. The non-transitory machine-readable storage medium of claim 1, wherein the event comprises any one or a combination of a power loss at the deduplication system, a fault, a failure, or a loss of data at the deduplication system.

6. The non-transitory machine-readable storage medium of claim 1, wherein accessing the item metadata of the backup item that is backed up to the remote object storage system comprises accessing the item metadata stored in the deduplication system or accessing a mirrored copy of the item metadata stored in the remote object storage system.

7. The non-transitory machine-readable storage medium of claim 1, wherein each respective request of the requests includes a respective portion object name including a respective identifier value that is within the range of identifier values.

8. The non-transitory machine-readable storage medium of claim 1, wherein the remote object storage system is an eventually consistent storage system.

9. The non-transitory machine-readable storage medium of claim 8, wherein the instructions upon execution cause the deduplication system to:
  divide a received backup item into a plurality of chunks;
  apply deduplication on the plurality of chunks to produce deduplicated chunks, including the chunks of the backup item; and
  store the deduplicated chunks in the remote object storage system.

10. The non-transitory machine-readable storage medium of claim 9, wherein the remote object storage system stores entity objects, wherein each of the entity objects includes a collection of the chunks of the backup item, and the instructions upon execution cause the deduplication system to:
  store an index that includes identifiers of the entity objects, each identifier of a respective one of the entity objects comprising a hash of a content of the respective entity object.

11. The non-transitory machine-readable storage medium of claim 10, wherein the index comprises a container index including chunk metadata for the chunks of the backup item that are included in a container corresponding to the container index, and wherein the chunk metadata for a respective one of the chunks comprises a signature of the respective chunk, and a hash of an entity object in which the respective chunk is included.

12. The non-transitory machine-readable storage medium of claim 11, wherein a mirrored copy of the container index is stored in the remote object storage system.

13. The non-transitory machine-readable storage medium of claim 10, wherein each respective portion object of the portion objects does not include the collection of chunks referred to by the records in the respective portion object.

14. An object storage system comprising:
  storage media to store chunks of backup items deduplicated by a deduplication system that is remote from the object storage system;
  a processor; and
  a machine-readable storage medium comprising instructions executable on the processor to:
    store portion objects of a first backup item of the backup items;
    store item metadata of the first backup item, wherein:
      each of the portion objects represents a given data range of the first backup item and includes records that contain metadata sufficient to access respective chunks of the given data range of the first backup item, and each of the portion objects is assigned a portion object name by which to access the portion object in the remote object storage system, each portion object name of each portion object including a respective identifier value within a given range of identifier values and including other information; and the item metadata including range information indicating a range of identifier values containing each of the identifier values used in the respective portion object names of the portion objects of the first backup item, wherein the item metadata at the object storage system is a mirrored copy of corresponding item metadata stored at the deduplication system;

receive, from the deduplication system, requests for respective attribute information of the portion objects of the first backup item, the requests including portion object names including identifier values limited to identifier values within the range of identifier values, wherein the requests comprise a first request including a first portion object name, and a second request including a second portion object name; and responsive to determining that a first portion object corresponding to the first portion object name is stored in the object storage system, send attribute information of the first portion object to the deduplication system in response to the first request; and responsive to determining that a second portion object referring to a group of multiple chunks and corresponding to the second portion object name is not stored in the object storage system, send, to the deduplication system in response to the second request, an indication that the second portion object is not stored by the object storage system; and wherein the instructions are executable on the processor to:

generate the portion object names for the portion objects of the backup item using the identifier values, the identifier values generated by successively advancing a portion number as each of the portion objects is successively created, wherein the portion object name for each of the portion objects includes a respective one of the identifier values.

15. The object storage system of claim 14, wherein the instructions are executable on the processor to:

store an entity object that includes a collection of chunks that are referred to by at least some of the records of the portion objects, the entity object identified by a name that includes a hash of a content of the entity object.

16. The object storage system of claim 15, wherein the machine-readable instructions are executable on the processor to:

store a container index comprising:

an identifier of the entity object, the identifier of the entity object comprising a hash of a content of the entity object, and chunk metadata for the chunks of the backup items that are included in a container corresponding to the container index, wherein the chunk metadata for a respective one of the chunks comprises a signature of the respective chunk, and the hash of the content of the entity object in which the respective chunk is included.

17. The object storage system of claim 14, wherein the instructions are executable on the processor to:

store a first entity object that includes a collection of chunks that are referred to by at least some of the records of the portion objects, the first entity object identified by a name that includes information of other entity objects that are part of a same set as the first entity object.

18. A deduplication system comprising:

a processor; and a non-transitory storage medium storing machine-readable instructions executable on the processor to:

divide a backup item into a plurality of chunks;

deduplicate the plurality of chunks to produce deduplicated chunks;

write the deduplicated chunks to a remote object storage system to back up the backup item in the remote object storage system that stores entity objects, wherein the remote object storage system is an eventually consistent storage system;

as part of a recovery process:

access item metadata of the backup item, the item metadata including range information indicating a range of identifier values for portion objects of the backup item, wherein an entity object of the entity objects includes a collection of chunks that are referred to by records of the portion objects;

issue requests to obtain respective attribute information of the portion objects of the backup item, the requests including portion object names including identifier values that are within the range of identifier values, wherein the requests comprise a first request including a first portion object name, and a second request including a second portion object name;

receive, responsive to the first request, attribute information of a first portion object of the portion objects;

receive, responsive to the second request, an indication that a second portion object corresponding to the second portion object name is not stored by the remote object storage system;

determine, based on the indication and the attribute information of the first portion object, a given portion object name that has already been used for a given portion object of the backup item; and store an index that includes identifiers of the entity objects, each identifier of a respective one of the entity objects comprising a hash of a content of the respective entity object.

19. The deduplication system of claim 18, wherein the instructions are executable on the processor to:

generate names for the portion objects of the backup item by advancing a portion number as each portion object is created, wherein a name for a respective portion object includes a respective one of the advancing portion numbers as an identifier value.

* * * * *